(12) United States Patent
Kubala et al.

(10) Patent No.: US 9,624,113 B2
(45) Date of Patent: Apr. 18, 2017

(54) METHOD FOR RECYCLING OILFIELD AND OTHER WASTEWATER

(71) Applicant: TERRA-HYDROCHEM, INC., Austin, TX (US)

(72) Inventors: Roger Kubala, Austin, TX (US); Robert Sloan, Austin, TX (US)

(73) Assignee: Terra-Hydrochem, Inc., Austin, TX (US)

( * ) Notice: Subject to any disclaimer, the term of this patent is extended or adjusted under 35 U.S.C. 154(b) by 0 days.

(21) Appl. No.: 15/110,247

(22) PCT Filed: Jan. 9, 2015

(86) PCT No.: PCT/US2015/010895
§ 371 (c)(1),
(2) Date: Jul. 7, 2016

(87) PCT Pub. No.: WO2015/106154
PCT Pub. Date: Jul. 16, 2015

(65) Prior Publication Data
US 2016/0326019 A1    Nov. 10, 2016

Related U.S. Application Data

(60) Provisional application No. 61/942,555, filed on Feb. 20, 2014, provisional application No. 61/980,351, filed on Apr. 16, 2014, provisional application No. 61/925,585, filed on Jan. 9, 2014.

(51) Int. Cl.
| | | |
|---|---|---|
| *C02F 1/24* | (2006.01) | |
| *C02F 9/00* | (2006.01) | |
| *C02F 9/02* | (2006.01) | |
| *C02F 1/40* | (2006.01) | |
| *C02F 1/72* | (2006.01) | |
| *E21B 21/06* | (2006.01) | |
| *C02F 101/12* | (2006.01) | |
| *C02F 101/32* | (2006.01) | |
| *C02F 103/10* | (2006.01) | |
| *C02F 101/30* | (2006.01) | |
| *C02F 101/34* | (2006.01) | |
| *C02F 101/36* | (2006.01) | |

(52) U.S. Cl.
CPC .......... *C02F 1/24* (2013.01); *C02F 1/40* (2013.01); *C02F 1/72* (2013.01); *C02F 1/727* (2013.01); *E21B 21/066* (2013.01); *E21B 21/068* (2013.01); *C02F 2101/12* (2013.01); *C02F 2101/306* (2013.01); *C02F 2101/32* (2013.01); *C02F 2101/34* (2013.01); *C02F 2101/36* (2013.01); *C02F 2101/40* (2013.01); *C02F 2103/10* (2013.01); *C02F 2305/04* (2013.01); *C02F 2305/08* (2013.01)

(58) Field of Classification Search
None
See application file for complete search history.

(56) References Cited

U.S. PATENT DOCUMENTS

| | | | |
|---|---|---|---|
| 3,707,464 A | 12/1972 | Burns et al. | |
| 3,740,329 A | 6/1973 | Li | |
| 4,001,114 A | 1/1977 | Joseph et al. | |
| 4,725,358 A | 2/1988 | Ananthapadmanabhan et al. | |
| 6,664,298 B1 | 12/2003 | Reinhart et al. | |
| 7,037,946 B1 | 5/2006 | Reinhart et al. | |
| 7,611,637 B2 * | 11/2009 | Zhang | B09C 1/002 204/157.15 |
| 7,963,720 B2 * | 6/2011 | Hoag | B09C 1/002 405/128.75 |
| 2011/0272348 A1 * | 11/2011 | Ramsburg | A62D 3/37 210/601 |

* cited by examiner

*Primary Examiner* — Thomas M Lithgow
(74) *Attorney, Agent, or Firm* — Gregory L. Porter; Andrews Kurth Kenyon LLP

(57) ABSTRACT

The present invention pertains to a process for treating waste water. The process involves contacting waste water with an emulsion of a nano scale compound comprising iron, magnesium, or both. Mixing results in a substantially foam-like layer at the surface of the mixture and treated water which may be separated.

21 Claims, No Drawings

METHOD FOR RECYCLING OILFIELD AND OTHER WASTEWATER

FIELD OF THE INVENTION

The present invention relates to a method and chemical process for waste water treatment. In particular, the process relates to, for example, reducing the TDS (total dissolved solids), extracting heavy metals, and degrading volatile organo-chlorides (VOC's), water-soluble organics, and/or petroleum hydrocarbons (PHC's) of a waste water solution. This makes the water recyclable and more environmentally friendly to use.

BACKGROUND AND SUMMARY OF THE INVENTION

The current demand for water, water management and water treatment technologies is directly related to the increase in oil and gas demands in the emerging shale plays in the USA and international markets. In particular, oil shale plays and liquid rich plays will make up a significant portion of the energy mix in addition to water flood drives and other enhanced oil recovery (EOR) methods to extract from older fields. In most cases, improved, enhanced and unconventional methods, water is injected and therefore water and water management are key factors for energy production.

Unfortunately, in many parts of the USA and other markets where oil and gas operations are performed, water can be limited. The oil and gas industry is now considering ways to reduce fresh water consumption, and to recycle waste water as well as oil and gas produced or flow back waters.

Typically, waste water cannot be safely released into the environment or reused for other processes or applications until the main contaminates have been removed. There are a number of waste water sources from agriculture, mining—AMD (acid mine drainage), quarries, others and in particular, oil & gas industries, such as shale fracking operations. Waste from shale operations is of significant importance in these unconventional gas and oil plays.

Shale plays cannot be economically commercialized without being fractured, which usually involves large volumes of water and proppant to keep the fractures open after treatment. This significant water need often becomes problematic because of limited fresh and saline water availability, volume required, transportation cost and issues, containment and spill concerns, and increasing regulatory pressures. Each well can require up to 250,000 barrels, i.e., 10,500,000 gallons of water. During well testing, as much as 40% of the fluid pumped during the fracturing procedure is returned in the first 3-4 weeks of well testing. Often, water continues to be produced during the lifetime of the well. These waters are referred to as flowback and/or produced water. Contaminates in these fluids may include chlorides, surfactants, sulfates, boron, polymer, sand, silt, clays, heavy metals, oils, condensate, biocides, and/or other elements of environmental concern.

Current fluid disposal methods can be costly due to transportation and these fluids are often simply pumped into a salt water disposal well where they are permanently depleted from the ecological system. Current treatments of these fluids are often limited due to costs and efficiency. Treatment costs are usually directly associated with the amount of total dissolved solids in solution and many applications, such are reverse osmosis, are often limited due to the amount of solids in solution. Distillation to clean water is similarly limited by the amount of process water it produces before the water reaches saturation and salts precipitate. Other examples of fluid treatment on these waters have included, electrocoagulation, oxidation, chemical precipitation, macro or nano and ultra filtration, ion-exchange, forward osmosis, evaporation and even dilution with fresh water sources. Such treatments such as ion exchanges or chemical softening or precipitation often do not directly alter the TDS or total dissolved solids, do not degrade or remove VOC's, water soluble organics, PHC's and/or heavy metals of the solutions. Thus, new waste water treatment methods are needed which reduce the TDS (total dissolved solids), extract heavy metals, and degrading volatile organo-chlorides (VOC's), water soluble organics and petroleum hydrocarbons (PHC's) of a waste water solution.

Similarly, new water treatment methods are needed with respect to agricultural waste water. Such agricultural waste water commonly results from, for example, pig or hog farms, chicken farms, fish or shrimp farms, milk or dairy farms, and to a lesser extent cattle ranching. The contaminants of agricultural waste water differ depending upon the type of agriculture but may include, for example, high organic content, high solids, nitrogen compounds such as nitrates, phosphorus compounds, antibiotics, hormones, copper, etc. Such waste water is believed to contribute to a higher mortality rate for the animals and is also often accompanied by noxious odors. Accordingly, new treatment methods to reduce one or more the aforementioned contaminants and/or associated odors would be beneficial.

Advantageously, the present invention often meets all the aforementioned needs and more. In one embodiment the invention relates to a process for treating waste water. The process comprises contacting the waste water with an aqueous emulsion. The aqueous emulsion comprises one or more oil-liquid membranes surrounding a nano scale compound comprising iron, magnesium, or both. Typically, the weight ratio of emulsion to waste water is from about 1:150 to about 1:3000. The waste water and emulsion is then mixed for a time and under conditions sufficient to lower the surface tension of said waste water to between about 35 to about 75 dynes per cm at 25° C. according to the definition of kilogram-force for all gravitational units. This forms a substantially foam-like layer at the surface of the mixture. The foam-like layer is removed from the mixture such that the mixture comprises treated water.

In another embodiment, the present invention pertains to a process for treating waste water. The process comprises first removing at least a substantial portion of any floating oil and solids from the waste water to form pre-treated waste water. The pre-treated waste water is provided to a conduit connected to an open or closed vessel in a manner such that the pre-treated waste water moves through the conduit to the open vessel. An aqueous emulsion is injected into the conduit at one or more injection points wherein the aqueous emulsion comprises one or more oil-liquid membranes surrounding a nano scale compound of iron, magnesium, or both. The weight ratio of emulsion to pre-treated waste water is typically from about 1:150 to about 1:3000 and the residence time in the conduit is at least about 1 minute up to about 30 minutes. The conditions are such that the surface tension of said waste water is lowered to between about 35 to about 75 dynes per cm at 25° C. according to the definition of kilogram-force for all gravitational units prior to said pre-treated waste water entering said open vessel. An oxidizing agent is then contacted with the waste water in the open or closed vessel under conditions sufficient to form a substantially foam-like layer at the surface of the open or closed vessel and treated water below. The substantially foam-like layer at the surface of the open or closed vessel is then separated from the treated water.

DETAILED DESCRIPTION

In one embodiment the invention relates to a process for treating waste water comprising dissolved solids. The source and type of waste water is not particularly important so long as it contains TDS (total dissolved solids), heavy metals, volatile organo-chlorides (VOC's), water soluble organics, and/or petroleum hydro-carbons (PHC's) which are capable of being reduced or removed with the present inventions. Any type of wastewater may benefit from the present invention.

Typically, the source of water is a produced fluid from an oil or gas operation such as fracking. Such produced fluids often have one or more contaminants which may be reduced or removed by the processes of the present invention. Such contaminants may include, but are not limited to, boron, barium, chlorides, dissolved solids, iron, lead, and/or cadmium. The amounts of each, if present, vary depending upon the wastewater to be treated. Typical waste water varies widely with respect to total dissolved solids but may range from 300 to 250,000 ppm or more. Using the processes of the invention one may reduce these as much as desired and typically below about 3000, or even below about 500 ppm if desired.

Alternatively, the source of water to be treated is an agricultural waste water such as, for example, water from pig or hog farms, chicken farms, milk or dairy farms, or even cattle ranching. The contaminants will vary depending upon the type of agriculture from which the water is derived. However, most agricultural waste water will derive at least some benefit from treatment according to the instant invention.

Recycling the waste water and converting it to meet or exceed the agricultural, e.g., livestock, water quality guidelines according to certain embodiments of the invention may in some instances reduce the microorganisms to, for example, fewer than 100 total bacteria per milliliter. In other embodiments, microorganisms may be reduced to, for example, fewer than 50 coliforms per milliliter of water. Physical measurements for treated agricultural, e.g., livestock, waste water may include that the water should be substantially clear and substantially odorless according to a simple visual and odor test. In other embodiments, treating agricultural, e.g., livestock, water according to the present methods may result in one, two, three, four, five, or even all six of the following: (1) total dissolved solids below about 500 mg/l; (2) pH of from about 6.5 to 8.5; (3) ammonia less than about 1 ppm; (4) nitrates below about 10 ppm; (5) chlorides below about 250 ppm; and/or (6) heavy metals below about 0.1 ppm according to conventional tests such as, for example, those described herein. Advantageously, the agricultural waste water treatment methods of the present invention can often be employed to meet applicable standards without the use of biocides and the like.

The waste water is first contacted with an emulsion. However, before doing so or simultaneously therewith it may be desirable to remove at least a substantial portion of any floating oil, solids, or mixture thereof from the waste water. The specifics of such removal are not particularly critical and thus may be accomplished in any convenient manner to form pre-treated water that is substantially free of floating oil and solids. Convenient manners of such removal may include, for example, mechanical methods such as sifting, skimming, or filtration, as well as, using adsorbents and the like.

In addition, before contacting the waste water with the emulsion or simultaneously therewith it may also be beneficial to conduct a simple oxidation of the waste water. In this manner, a majority of readily removable water phase PHC's, chlorides, boron, barium and transitional metals (such as iron, lead, cadmium, etc.) are reduced and/or removed. If desired, total suspended solids and iron may also be reduced and/or removed prior to contacting the waste water with the emulsion.

The waste water is contacted with the emulsion in any convenient manner and such method of contact may vary depending upon the specific equipment, specific waste water composition, and specific emulsion. Advantageously, the processes are useful over a wide range of temperatures. Typically, the temperatures employed are such that the emulsion is readily capable of pumped. Depending upon the specific emulsion such temperature is usually at least about 50, or at least about 60, or at least about 65° F. On the other hand, the temperatures are not so high that the wastewater evaporates or the emulsion degrades prior to functioning properly. Because the wastewater typically contains salts and other dissolved salts, the wastewater's boiling point may be higher than conventional water. In this manner, temperatures as high as 300° F. may sometimes be employed. Typically, the temperatures employed are below about 200, or below about 180, or below about 170° F. The wide useful temperature range is advantageous in that often produced fluids are above about 100° F. and can still be contacted directly with the emulsion without requiring any cooling. The wide useful temperature range is advantageous for agricultural waste water in that it is often in a pond or holding tank exposed to outdoor air temperatures that can vary widely with the season and geographic location.

In one embodiment, untreated or pre-treated waste water is provided to a conduit which is connected to a vessel in a manner such that the pre-treated waste water moves through the conduit to the vessel. The vessel is typically an open or closed vessel of any shape and dimensions. The emulsion is injected into the conduit at one or more injection points. Such injection point may be at the opening of the conduit or along the path of the conduit. That is, the manner of contact via injection point or points other otherwise is not particularly critical so long as the emulsion and waste water are subsequently mixed appropriately. Such mixing will necessarily vary depending upon the selected equipment but is usually mechanical mixing such as with a paddle or other stirring mechanism. Alternatively, in the case of a conduit and an open or closed vessel appropriate mixing may occur simply by virtue of the turbidity caused by the injection. Alternatively, mixing by, for example, a static mixer with some sort of dedicated path may be employed.

In another embodiment which may be particularly applicable to wastewater at, for example, pig, chicken, or agricultural farms, the waste water is treated via misting it with the emulsion. Any misting system capable of effectively delivering the emulsion in the desired amounts to the waste water may be employed. In addition or as an alternative to a manually controlled system, a misting system could be controlled electronically. In this manner, it could be activated via timers and/or via sensors such that it is turned on or emulsion amounts adjusted based on the level of certain contaminates in the waste water. If desired, in some applications a dewatering box may be employed to process solid wastes from or washed from, for example, livestock housing.

The weight ratio of emulsion to untreated or pre-treated waste water varies depending upon the composition of the untreated or pre-treated waste water, emulsion, desired final product, and other conditions. It has been found that weight ratios of emulsion to untreated or pre-treated waste water of at least about 1:150, or at least about 1:250, or at least about 1:750, or at least about 1:1000, or at least about 1:1250 are often useful. On the other hand, weight ratios of emulsion to untreated or pre-treated waste water of less than from about to about 1:3000, or less than about 1:2500, or less than about 1:2000 are useful.

As with produced water from oil and gas operations, in agricultural applications the weight ratio of emulsion to waste water also varies depending upon the specific agricultural application, the composition of the untreated or pre-treated waste water, emulsion, desired final product, and other conditions. For example, in some agricultural embodiments there may be different ratios depending upon whether the emulsion is being used for routine maintenance or treatment of some specific level of contaminant such as organochlorides. That is, in some cases for maintenance the weight ratio of emulsion to waste water may be from about 1:2000 to about 1:2500. On the other hand, if used for treatment of contaminants then the weight ratio of emulsion to waste water may be from about 1:250 to about 1:1250 with higher amounts of emulsion used for treating higher levels of organochlorides.

Of course, the agricultural applications are not limited to livestock and can also be used for aquatic applications such as shrimp and fish farms. In such applications, the ratios also vary depending upon the type of fish or shrimp, the contaminants, environmental conditions and the like. However, in many cases aquatic applications may employ a weight ratio of emulsion to water of from about 1:3000 to about 1:5000.

The contact and mixing conditions differ depending upon the reactants and other conditions employed. That is, any convenient conditions may be employed so long as a substantially foam-like layer is subsequently formed at the surface of the mixture. Typically, the contact time for the waste water and emulsion are such that the surface tension of said waste water becomes below about 75, or below about 50 dynes per cm, down to about 45, or down to about 35 dynes per cm at 25° C. according to the definition of kilogram-force for all gravitational units. That is, if a conduit and open or closed vessel are employed then there is sufficient mixing and time for the surface tension to be lowered below about 75, or below about 50 dynes per cm down to about 45, or down to about 35 dynes per cm at 25° C. according to the definition of kilogram-force for all gravitational units prior to said pre-treated waste water entering said open vessel. Typically, if pumping is to be employed, then it may be easier to pump at between about 45 to about 65 dynes per cm at 25° C.

The mixing time also varies depending upon the equipment, reactants, and other conditions employed. Generally, mixing time is less at higher temperatures. At typical or ambient temperatures using a conduit and open vessel, the residence time in the conduit is usually at least about 1 minute, or at least about 3 minutes, or at least about 5 minutes, up to about 60 minutes, or up to about 45 minutes, or up to about 30 minutes. For processing of water in, for example, open ponds as may done in agricultural applications the emulsion may be pre-mixed with wastewater in a small tank prior to discharge in the pond.

The aqueous emulsion employed may vary depending upon the reactants, equipment, and conditions employed, as well as, the desired results. The specific emulsion is not particularly critical so long as it results in a substantially foam-like layer formed at the surface of the mixture of the emulsion and waste water. Typically, the emulsion comprises one or more oil-liquid membranes surrounding a nano scale compound of iron, magnesium, or both. In many instances it is preferable that the emulsion comprises one or more food grade plant oil-liquid membranes surrounding a nano scale compound of iron, magnesium, or both.

The nano scale compound of iron, magnesium, or both may be any that is capable of being encapsulated, i.e., surrounded, by one or more oil-liquid membranes. The nano scale compound is typically selected from the group consisting of chelated iron, chelated magnesium, iron/magnesium, zero valent magnesium, zero valent iron, or a mixture thereof. By nanoscale is meant particles wherein the mean diameter of the metal particles is at least about 50, or at least about 75, or at least about 100 nm up to about 600, or up to about 500, or up to about 400 nm. By "food grade plant oil-liquid membrane" is meant a substantially hydrophobic membrane comprised of biodegradable surfactant and biodegradable oil. In this manner, when water is employed with biodegradable surfactant, biodegradable oil, and the nanoscale compound, then an aqueous emulsion is formed.

The aforementioned aqueous emulsions may be prepared in any convenient manner. Typically, an emulsion is made by first acquiring or making a metal compound, i.e., emulsion precursor. For example, a chelated iron precursor is prepared by mixing nanoscale chelated iron, water, and a chelating agent and heating it to form a slurry. A chelated magnesium precursor may be made by mixing water, base such as sodium hydroxide, and nanoscale magnesium. An iron/magnesium precursor may be made by mixing nanoscale magnesium, hot iron, and one or more surfactants such as polysorbates and/or fatty acid esters such as sorbitan esters. Similarly, a zero valent magnesium precursor may be made by mixing water, a base such as sodium hydroxide, nanoscale zero valent nanoscale magnesium, and one or more surfactants such as polysorbates and/or fatty acid esters such as sorbitan esters while zero valent iron precursor may be made by mixing water, a mineral acid, nanoscale zero valent iron, one or more surfactants such as polysorbates and/or fatty acid esters such as sorbitan esters.

Once the metal precursor is formed it is typically added by itself or with other precursors to non-ionic surfactants and emulsifiers with vigorous mixing. The type and amount, if any, of added surfactants and emulsifiers depends in many cases on the amount in the precursor(s). A particularly preferable emulsifier may include alkylamine linear alkyl aryl sulfonates. The type and amount of metal compound in the emulsion varies depending upon target contaminate(s) of the wastewater. Typically, the weight of the metal compound in the emulsion is at least about 0.05, or at least about 0.08, or at least about 0.1 weight percent based on the total weight of the emulsion. On the other hand, the weight of the metal compound in the emulsion is not so much that it would interfere with the treatment process or cause significant environmental issues. In most cases, the weight of the metal compound in the emulsion is less than about 15, or less than about 8, or less than about 5, or less than about 3 weight percent based on the total weight of the emulsion.

A particularly useful emulsion may be prepared by encapsulating a nanoscale $Mg_2FeH_6$ into an emulsifier and water to form an intermediate. The intermediate may then be mixed with one more linear anionic surfactants to form the emulsion.

Methods of making emulsions of zero-valent iron are described in, for example, U.S. Pat. No. 6,664,298 which is incorporated herein by reference. Typical oil-liquid membranes may be formed by any convenient ingredients so long as the metal compound is isolated from oxygen in water carrier. This can be done by, for example, utilizing chemical and high impact blending of Tween 80™ (polysorbate 80), Tween™ 20 (polysorbate 20), and/or Span™ 85 (Sorbitan Trioleate). This is then mixed with water and nanoscale chelated iron, chelated magnesium, zero valent magnesium, zero valent iron, or iron/magnesium to form hydrophobic emulsion droplets (micelles) that are infused into a hydrophilic emulsion droplet from, for example, modified linear anionic surfactant further mixed with a nonionic surfactant such as Tomadol™ 1200. Suitable anionic surfactants may include, for example, alpha-sulphonated methyl esters from a suitable vegetable oil, palm oil, soy oil, or hydrocarbon oil. Suitable hydrocarbon oils include synthetic, olefin, esters, non-water soluble alcohols such as 2-ethyl hexanol and the like. In this manner, the emulsion is often miscible with the targeted compounds in the waste water.

Using the instant description the skilled artisan can formulate an emulsion based on the desired specific contaminants to be reduced or eliminated in the waste water. While not wishing to be bound to any particular theory it is believed that the above-described emulsion temporarily protects the nanoscale compound from oxidizers. It is believed that chlorinated volatile organic compounds diffuse through the oil membrane and undergo abiotic reductive dechlorination in the presence of, for example, the nano scale compound of iron, magnesium, or both in the interior aqueous phase. That is, encapsulating the nano scale compound of iron, magnesium, or both in a hydrophilic membrane protects the nanoscale metal compound from oxygen and other ground-water constituents such as inorganics that might foul its reducing capabilities. In this manner, the composition of the wastewater solution may be altered based on the TDS levels and final characteristics desired.

The emulsion is contacted with the waste water as described above to form a substantially foam-like layer at the surface of the mixture. For agricultural applications it may not be necessary to form and/or remove a foam-like layer. That is, simple treatment via mixing may be employed. If desired, an oxidizing agent may be employed by, for example, supplying an oxidizing agent such as oxygen in the form of, for example, by applying a feed, e.g., continuous or via one or more bursts, of air, ozone, peroxide, or other oxygen containing gas. Other oxidizing agents may also be employed in the present invention in gas or powder form. For example, an anionic component of a salt such as, for example, metal salts of chromates and dichromates, chlorates and perchlorates, nitrates, perborates, perchloric acid (below 70% concentration) and hydrogen peroxide. Also, salts such as alkali or alkaline earth metal salts of hypochlorite, permanganate, and peroxide may be employed such as chromium trioxide, hydrogen peroxide, halane, and nitric acid. A particularly useful agent may be sodium permanganate. Other oxidizers include ammonium dichromate, potassium chlorate, hydrogen peroxide, calcium hypochlorite, sodium chlorate, perchloric acid, sodium chlorite, and potassium bromate. Others may include ammonium perchlorate, ammonium pernitrate, and potassium superoxide.

The process steps and process may be employed batchwise or continuously. Advantageously, the resulting treated water after removing or otherwise separating the foam-like layer in any convenient manner may reduce total dissolved solids as much as desired and typically below about 3000, or even below about 500 ppm if desired. That is, the process may be repeated as necessary to obtain the desired reduction in total dissolved solids. The treated water can then be treated even further if desired with, for example, a reverse osmosis membrane or other filter media to further enhance its quality.

Advantageously, the process is useful to eliminate the need for fresh water sources for shale fracturing operations and to recycle produced and flowback waters on site, at an impoundment, a salt water facility, or other locations at reduced costs and footprint of current technologies. This reduces or even eliminates the risk of potential spills during storage and/or transportation of salt water brine through pipes, hoses, and ground transport. It also allows for efficient and safe reuse on site or elsewhere.

EXAMPLE 1

Chelated Iron Emulsion

An aqueous emulsion comprising one or more oil-liquid membranes surrounding a nano scale compound comprising chelated iron is mixed. Specifically, chelated iron may be bought or prepared. Suitable chelated iron compounds are usually in the range of from about 6 to about 12% iron chelated with, for example, an amine such as EDTA (Ethylenediaminetetraacetic acid), EDDHA, and/or DTPA. Specific suitable molecular formulas include, for example, $C_{10}H_{12}N_2O_8$ $FeNa.3H_2O$, $C_{18}H_{16}N_2.6FeNa$, and $DTPA.Fe.HNa$.

The chelated iron is next mixed with from about 25 to about 65 weight percent emulsifier and from about 15 to about 50 weight percent non-ionic surfactant and from about 5 to about 35 weight percent of an ester surfactant. Typical emulsifiers include one or more of the following: Branched Dodecyl Benzene Sulfonic Acid, Dioctyl sodium sulfosuccinate, Isopropylamine Branched Alkyl Benzene Sulfonate, Isopropylamine Linear Alkyl Benzene Sulfonate, Linear Alkyl Benzene Sulfonic Acid, Sodium Alpha Olefin (C12) Sulfonate, Sodium Alpha Olefin (C14-16) Sulfonate, Sodium Branched Alkyl Benzene Sulfonate, Sodium Branched Dodecyl Benzene Sulfonate, Sodium Lauryl Sulfate, Sodium Linear Alkyl Benzene Sulfonate, Sodium Linear Alkyl Benzene Sulfonate Slurry, Sodium Linear Alkylbenzene Sulfonate, Sodium Olefin Sulfonate, Sodium Oleic Sulfonate, Triethanolamine Linear Alkyl Benzene Sulfonate.

Useful non-ionic surfactants may include linear ethoxylated alcohols such as those called TOMADOL available from Air Products. Typical ester surfactants may include one or more of the following: Glycerol α-Monostearate, Monomyristin, Monopalmitin, Monostearin, Polyethylene Glycol Monolaurate n≈10, Polyethylene Glycol Monostearate Polyethylene Glycol Monostearate n≈2, Polyethylene Glycol Monostearate n≈25, Polyethylene Glycol Monostearate n≈4, Polyethylene Glycol Monostearate n≈40, Polyethylene Glycol Monostearate n≈45, Polyethylene Glycol Monostearate n≈55, Sorbitan Monopalmitate, Sorbitan Sesquioleate, Sorbitan Monolaurate, Sorbitan Monopalmitate, Sorbitan Monostearate, Sorbitan Monooleate, Sorbitan Sesquioleate, Sorbitan Trioleate, Polyoxyethylene-sorbitan monostrearate, Polyoxyethylene-sorbitan tristeanate, Polyoxyethylene-sorbitan monooleate, Polyoxyethylene-sorbitan monooleate, and Polyoxyethylene-sorbitan trioleate.

EXAMPLE 2

Chelated Magnesium Emulsion

A chelated magnesium emulsion may be made in a substantially similar manner as in Example 1 except that a a magnesium chelate is employed instead of a chelated iron. Suitable magnesium chelates include from about 6 to about 12% magnesium chelated with, for example, EDTA (Ethylenediaminetetraacetic acid) and the like. Other suitable chelated magnesium compounds include EDTA-MgNa.H2O.

EXAMPLE 3

Zero Valent Emulsions

Zero valent magnesium, iron, or mixtures of magnesium and iron are made substantially as described in U.S. Pat. Nos. 6,664,298 and 7,037,946 which are incorporated herein by reference.

EXAMPLE 4

Treating Produced Water

Produced water and flowback water from oil or liquids producing shales may have a number of contaminates including, for example, iron contamination, barium contamination, calcium contamination, strontium contamination, sulfate contamination, soluble organic compounds, oily solids contamination, soluble hydrocarbon contamination, polymer & gel contamination, solids, clays, sand, silt contamination, salts including monovalent, divalent and metal, as well as, scale & corrosion inhibitors. The presence and amount of the above may vary depending upon the particular well or shale play.

Typical shale in Arkansas, Pennsylvania, and North Texas ranges in total dissolved solids (TDS) from approximately 1,000-250,000 ppm and varies with the actual field or shale play. For example, in South Texas TDS may be 40,000 ppm while in West Texas it may be 100,000 ppm and in, for example, Pennsylvania it may be 80,000-250,000 ppm. Typically, the instant process will remove the solids that are larger than about 20 microns and reduce the TDS to any desired level and in some cases to below about 3000 pmm or, if desired, even below about 500 ppm. Accordingly, an aqueous emulsion of example 1, example 2, or some other emulsion may be employed to treat wastewater depending upon the contaminant type, concentration, and desired results.

For produced water treatment, pre-treatment of solids may be employed. This assists in removing, for example, the majority of oil, oily solids, iron laden solids, fines, clays, sand, silt, etc. In this manner, reduced concentrations and amounts of the desired emulsion may be necessary. If operating from a salt water well disposal facility, the solids in the wastewater may be treated after the wastewater has passed through an initial settling system and any wash tanks or gun barrels that may be employed for oil separation. Typically, a settling tank is used for treating oil. Oil and brine are separated only by gravity segregation forces. The clean oil floats to the top and brine is removed from the bottom of the tank.

In instances where the waste water may still be oily or have significant solids it may be useful to treat the oily water by using a corrugated plate separator, a dissolved air flotation cell, a lamella separator, a hydrocyclone or some combination thereof. A lamella separator or clarifier (inclined-plate clarifier) is designed to remove particulates and could be used in addition to or in place of a settling tank. A series of inclined plates provide a large effective settling area for a small footprint. The inlet stream is stilled upon entry into the clarifier. Solid particles begin to settle onto the plates and begin to accumulate in collection hoppers at the bottom of the clarifier unit. The sludge is drawn off at the bottom of these hoppers and the clarified liquid exits the unit at the top. A hydrocyclone (often referred to in the shortened form cyclone) is separates particles in a liquid suspension based on the ratio of their centripetal force to fluid resistance. If it is desired to further remove solids then a bag filter of 0.2-100 micron could be used or in addition or alternatively, a cartridge or other filtration or even a membrane could be employed.

Upon removing solids and oil from the waster water, the emulsion is then mixed with the wastewater in the concentrations and amounts described above. Once treated, a dewatering box or DE press filter may be used to compress the waste prior to disposal in an approved land fill. Results of a typical waste water treatment are shown below. Any byproduct gases such as chlorine-containing gases or carbon dioxide may be vented to atmosphere or captured and further processed via scrubbing and the like.

EXAMPLE 5

Results of Treating Produced Water

In a manner similar to the examples above, seven different emulsions according to the invention were used in seven different water trials at a drilling site in Eagle Ford wherein the water to be treated initially comprised 24,000 ppm total chlorides and 100,000 ppm TPH. The results are shown below.

| | |
|---|---|
| Chlorobromomethane | Non-detectable |
| Carbon tetrachloride | Non-detectable |
| Dibromochloromethane | Non-detectable |
| Chlorobenzene | Non-detectable |
| Chloroethane | Non-detectable |
| Chloroform | Non-detectable |
| Chloromethane | Non-detectable |
| 1,1-Dichloroethane | Non-detectable |
| 1,2-Dichloroethane | Non-detectable |
| 1,1-Dichloroethene | Non-detectable |
| cis-1,2-Dichloroethene | Non-detectable |
| trans-1,2-Dichloroethene | Non-detectable |
| 1,2-Dichloropropane | Non-detectable |
| cis-1,3-Dichloropropene | Non-detectable |
| trans-1,3-Dichloropropene | Non-detectable |
| Methylene Chloride | Non-detectable |
| 1,1,2,2-Tetrachloroethane | Non-detectable |
| Tetrachloroethene | Non-detectable |
| 1,1,1-Trichloroethane | Non-detectable |
| 1,1,2-Trichloroethane | Non-detectable |
| Trichloroethene | Non-detectable |
| Vinyl chloride | Non-detectable |
| Bromodichloromethane | Non-detectable |
| 1,2-Dichloroethene, Total | Non-detectable |

| TPH's | Amount after treatment |
|---|---|
| C6-C12 | 500 ppm |
| >C12-C28 | 500 ppm |
| >C28-C35 | 500 ppm |

In a manner similar to the examples above, seven different emulsions according to the invention were used in seven different water trials at a drilling site at Permian Basin wherein the water to be treated initially comprised a number of contaminates. BC-1 was a $MG_2FeH_6$ emulsion and bursts of the oxidizing agent $O_2$ were bubbled in the wastewater as described above. BC-2 was a zero valent iron emulsion and bursts of the oxidizing agent $O_2$ were bubbled in the wastewater as described above. BC-3 was a chelated iron emulsion and bursts of the oxidizing agent $O_2$ were bubbled in the wastewater as described above. BC-4 was a zero valent magnesium emulsion and bursts of the oxidizing agent $O_2$ were bubbled in the wastewater as described above. BC-5 was a zero valent magnesium emulsion and bursts of $NO_2$ were bubbled in the wastewater as described above. BC-6 was a zero valent iron emulsion and bursts of $NO_2$ were bubbled in the wastewater as described above. BC-7 was a chelated magnesium emulsion without oxidizing agent.

| | Baseline mg/l | BC-1 mg/l | reduction % | BC-2 mg/l | reduction % | BC-3 mg/l | reduction % |
|---|---|---|---|---|---|---|---|
| Barium | 24.500 | 0.557 | −97.727 | 1.430 | −94.163 | 1.520 | −93.796 |
| Boron | 25.400 | 0.345 | −98.642 | 1.010 | −96.024 | 0.843 | −96.681 |
| Chlorides | 13.100 | 1.780 | −99.986 | 5.320 | −99.959 | 3.370 | −99.974 |

| BC-4 mg/l | reduction % | BC-5 mg/l | reduction % | BC-6 mg/l | reduction % | BC-7 mg/l | reduction % |
|---|---|---|---|---|---|---|---|
| 3.010 | −87.714 | 3.280 | −86.612 | 6.600 | −73.061 | 3.220 | −86.857 |
| 1.500 | −94.094 | 2.690 | −89.409 | 2.050 | −91.929 | 1.180 | −95.354 |
| 5.150 | −99.961 | 6.210 | −99.953 | 7.100 | −99.946 | 3.730 | −99.972 |

EXAMPLE 6

Results of Treating Agricultural Water

Contaminated soil from a chemical plant was treated using an emulsion similar to the one used in the examples above. The soil was saturated with water and treated with emulsion. The various chemicals were then measured in the water with conventional techniques and the results reported below in the liquid result column. The water was then evaporated and the soil was kept in an N2 environment for seven days. The various chemicals were then measured and the results reported in the soil result anaerobic 7 days column. Next, the soil was kept in an O2 environment and the various chemicals were measured and the results reported in the soil result aerobic 14 days column. The amounts in the table are reported in parts per billion.

| Test Description SW-846 8081A | Base - Soil HC-24-2 | Result Liquid | Soil Result Anaerobic 7 days | Soil Result Aerobic 14 days |
|---|---|---|---|---|
| 4,4'-DDD, Solid | 27,000 | 9.0 | 8,000 | 6,100 |
| 4,4'-DDE, Solid | 24,000 | 1.0 | 0 | 0 |
| 4,4'-DDT, Solid | 40,000 | 0.0 | 0 | 0 |
| Aldrin, Solid | 26,000 | 0.0 | 0 | 0 |
| alpha-BHC (alpha-Hexachlorocyclohexane), Solid | 67,000 | 1.0 | 0 | 0 |
| alpha-Chlordane, Solid | 85,000 | 0.0 | 0 | 0 |
| beta-BHC (beta-Hexachlorocyclohexane), Solid | 91,000 | 98.0 | 21,000 | 5,800 |
| Chlordane, Solid | 580,000 | 44.0 | 0 | 0 |
| delta-BHC (delta-Hexachlorocyclohexane), Solid | 24,000 | 0.0 | 0 | 0 |
| Dieldrin, Solid | 26,000 | 0.0 | 0 | 0 |
| Endosulfan I, Solid | 24,000 | 0.6 | 0 | 0 |
| Endosulfan II, Solid | 180,000 | 0.0 | 8,000 | 3,400 |
| Endosulfan sulfate, Solid | 34,000 | 0.0 | 0 | 0 |
| Endrin aldehyde, Solid | 43,000 | 0.3 | 0 | 0 |
| Endrin ketone, Solid | 27,000 | 0.0 | 0 | 0 |
| Endrin, Solid | 25,000 | 0.7 | 0 | 0 |
| Heptachlor epoxide, Solid | 30,000 | 0.0 | 0 | 0 |
| Heptachlor, Solid | 140,000 | 0.0 | 0 | 0 |
| Methoxychlor, Solid | 70,000 | 0.0 | 0 | 0 |
| Toxaphene, Solid | 18,000,000 | 45.0 | 390,000 | 170,000 |

-continued

| Test Description SW-846 8081A | Base - Soil HC-24-2 | Result Liquid | Soil Result Anaerobic 7 days | Soil Result Aerobic 14 days |
|---|---|---|---|---|
| gamma-BHC (Lindane), Solid | 24,000 | 0.0 | 0 | 0 |
| gamma-Chlordane, Solid | 120,000 | 0.0 | 1,800 | 420 |
| | Units: µg/l - ppb | Units: µg/l - ppb | Units: µg/l - ppb | Units: µg/l - ppb |

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A process for treating waste water comprising dissolved solids wherein the process comprises:
    contacting the waste water with an aqueous emulsion comprising one or more oil-liquid membranes surrounding a nano scale compound comprising iron, magnesium, or both, wherein the weight ratio of emulsion to waste water is from about 1:150 to about 1:3000; and
    mixing the waste water and emulsion for a time and under conditions sufficient to lower the surface tension of said waste water to from about 35 to about 75 dynes per cm at 25° C. according to the definition of kilogram-force for all gravitational units and form a substantially foam-like layer at the surface of the mixture; and
    removing said foam-like layer from the mixture such that the mixture comprises treated water.

2. The process of claim 1 which further comprises removing at least a substantial portion of any floating oil from the waste water prior to contacting it with the emulsion.

3. The process of claim 1 which further comprises removing at least a substantial portion of any solids from the waste water prior to contacting it with the emulsion.

4. The process of claim 1 wherein the time of contacting and mixing is from about 1 minute to about 30 minutes.

5. The process of claim 1 wherein the process further comprises supplying an oxidizing agent to the waste water during or subsequent to mixing.

6. The process of claim 5 wherein the oxidizing agent is oxygen.

7. The process of claim 6 wherein the oxygen is supplied by applying a feed of air, ozone, peroxide, or other oxygen containing gas.

8. The process of claim 5 wherein the oxidizing agent is selected from the group consisting of metal salts of chromates, dichromates, chlorates, perchlorates, and nitrates, perborates; perchloric acid; hydrogen peroxide; salts of hypochlorite, permanganate, and peroxide; sodium permanganate; chromium trioxide; halane; nitric acid; ammonium dichromate; potassium chlorate; calcium hypochlorite; sodium chlorate; perchloric acid; sodium chlorite; potassium bromate; ammonium perchlorate; ammonium pernitrate; potassium superoxide; and mixtures thereof.

9. The process of claim 1 wherein the process is conducted on a continuous basis.

10. The process of claim 1 wherein the process is conducted on a batch basis.

11. The process of claim 1 wherein the treated water comprises a total solids content of less than about 3000 ppm.

12. The process of claim 1 which further comprises treating said removed foam-like layer to form a dry filter cake.

13. The process of claim 12 which further comprises injecting said dry filter cake into a salt water disposal well.

14. The process of claim 1 wherein the wastewater is a produced fluid from an oil or gas operation.

15. The process of claim 1 wherein the wastewater is a produced fluid from a fracking operation.

16. A process for treating waste water wherein the process comprises:
    removing at least a substantial portion of any floating oil and solids from the waste water to form pre-treated waste water;
    providing said pre-treated waste water to a conduit connected to a vessel in a manner such that the pre-treated waste water moves through the conduit to the vessel;
    injecting an aqueous emulsion into the conduit at one or more injection points wherein the aqueous emulsion comprises one or more oil-liquid membranes surrounding a nano scale compound comprising iron, magnesium, or both, wherein the weight ratio of emulsion to pre-treated waste water is from about 1:150 to about 1:3000, wherein the residence time in the conduit is at least about 1 minute up to about 30 minutes, and wherein the conditions are sufficient to lower the surface tension of said waste water to from about 35 to about 75 dynes per cm at 25° C. according to the definition of kilogram-force for all gravitational units prior to said pre-treated waste water entering said vessel; and
    contacting an oxidizing agent with the waste water in the vessel under conditions sufficient to form a substantially foam-like layer at the surface of the vessel and treated water below; and
    separating the substantially foam-like layer at the surface of the vessel from the treated water.

17. The process of claim 16 wherein the oxidizing agent is oxygen.

18. The process of claim 17 wherein the oxygen is supplied by a feed of air, ozone, peroxide, or other oxygen containing gas.

19. The process of claim 16 wherein the process is conducted on a continuous basis.

20. The process of claim 16 wherein the process is conducted on a batch basis.

21. The process of claim 16 wherein the emulsion is prepared by encapsulating a nanoscale $Mg_2FeH_6$ into an emulsifier to form an intermediate and then mixing the intermediate with one more linear anionic surfactants and water.

* * * * *